US007328932B2

(12) United States Patent
Plavetich et al.

(10) Patent No.: US 7,328,932 B2
(45) Date of Patent: Feb. 12, 2008

(54) AUTOMOTIVE DOOR HINGE

(75) Inventors: Richard Plavetich, Laguna Beach, CA (US); John Cupit, Olivenhain, CA (US)

(73) Assignee: Nissan Design America, Inc., San Diego, CA (US)

( * ) Notice: Subject to any disclaimer, the term of this patent is extended or adjusted under 35 U.S.C. 154(b) by 176 days.

(21) Appl. No.: 11/315,684

(22) Filed: Dec. 22, 2005

(65) Prior Publication Data

US 2007/0145774 A1 Jun. 28, 2007

(51) Int. Cl.
*B60J 5/00* (2006.01)
(52) U.S. Cl. .................................... 296/146.11; 16/366
(58) Field of Classification Search ........... 296/146.11, 296/146.12; 16/366, 288, 287, 294, 302
See application file for complete search history.

(56) References Cited

U.S. PATENT DOCUMENTS

| 3,095,600 | A | 7/1963 | Bretzner |
| 4,632,447 | A | 12/1986 | Nomura et al. |
| 4,641,881 | A | 2/1987 | Nomura et al. |
| 4,650,241 | A | 3/1987 | Motonami et al. |
| 4,678,198 | A | 7/1987 | Nomura |
| 5,249,334 | A | 10/1993 | Horberg et al. |
| 5,365,639 | A | 11/1994 | Lewkoski |
| 6,030,025 | A | 2/2000 | Kanerva |
| 6,182,952 | B1 | 2/2001 | Gutierrez |
| 6,382,705 | B1 * | 5/2002 | Lang et al. ............ 296/146.12 |
| 6,606,763 | B1 | 8/2003 | Bruckner |
| 6,817,065 | B1 | 11/2004 | Bruckner |
| 7,137,174 | B2 | 11/2006 | Derbis et al. |
| 2002/0073507 | A1 * | 6/2002 | Presley ....................... 16/333 |

OTHER PUBLICATIONS

Mark Vaughn, Spirited Speedster: It Lets You Race Even When It's in Park (AutoWeek), Nov. 14, 2005, pp. 16-17.

* cited by examiner

*Primary Examiner*—Lori L. Lyjak
(74) *Attorney, Agent, or Firm*—Young Basile Hanlon MacFarlane & Helmholdt, P.C.

(57) ABSTRACT

A vehicle door and hinging is described that allow for the door of a vehicle to be translated forward and rotated upward upon being opened in order to improve occupant ingress and egress. In addition, the doors and hinges of embodiments of the present invention allow for the door to be translated slightly outward for increased body panel clearance. In one embodiment of the present invention, a door has a four bar link hinge where the first and second pivots of a first bar of the four bar link hinge each allow for a single degree of motion. The pivot points are not co-axial and allow the door to translate vertically and horizontally. A second bar has first and second pivot points that each allow for three degrees of rotation to allow for the vertical and horizontal translation of the door member when actuated.

24 Claims, 5 Drawing Sheets

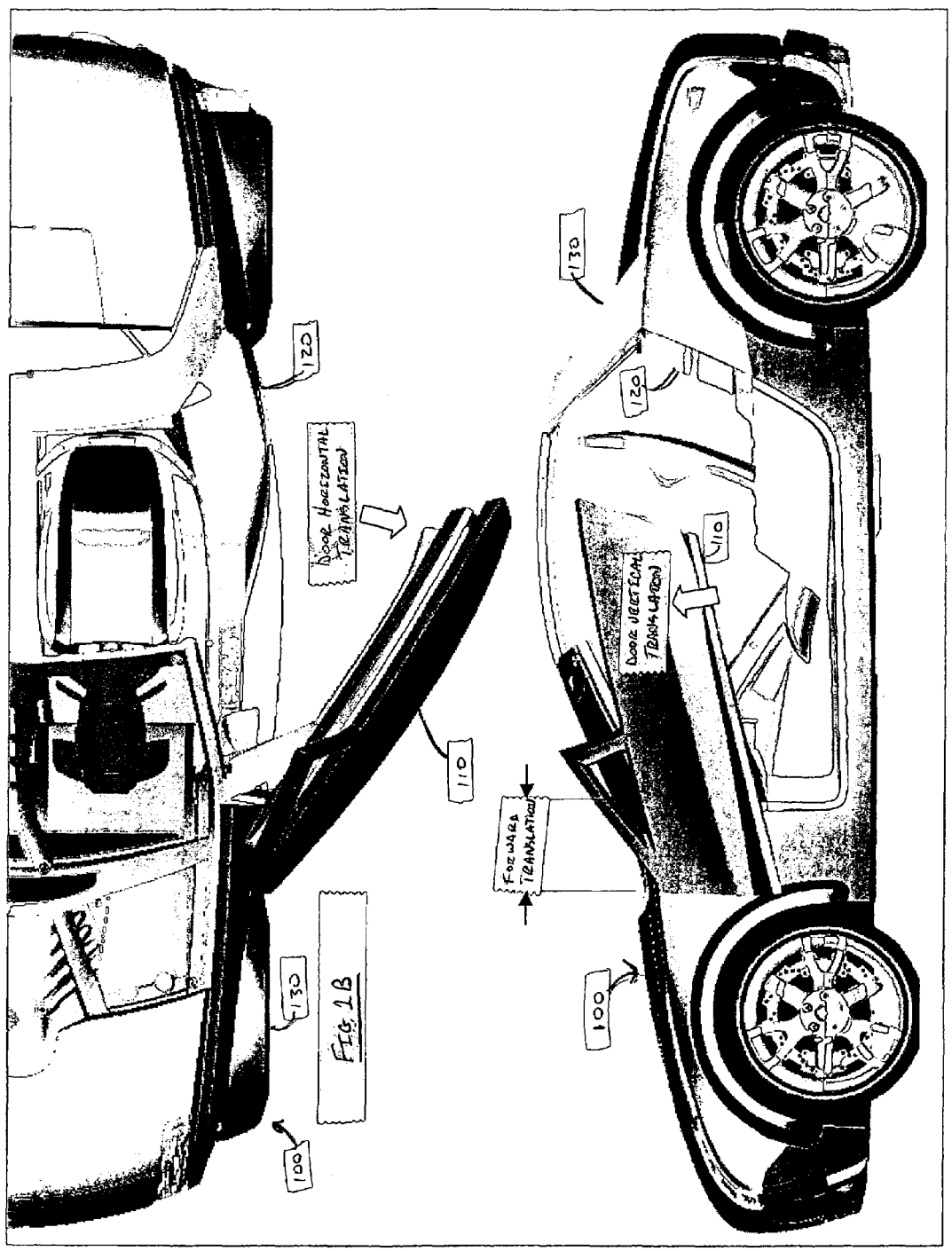

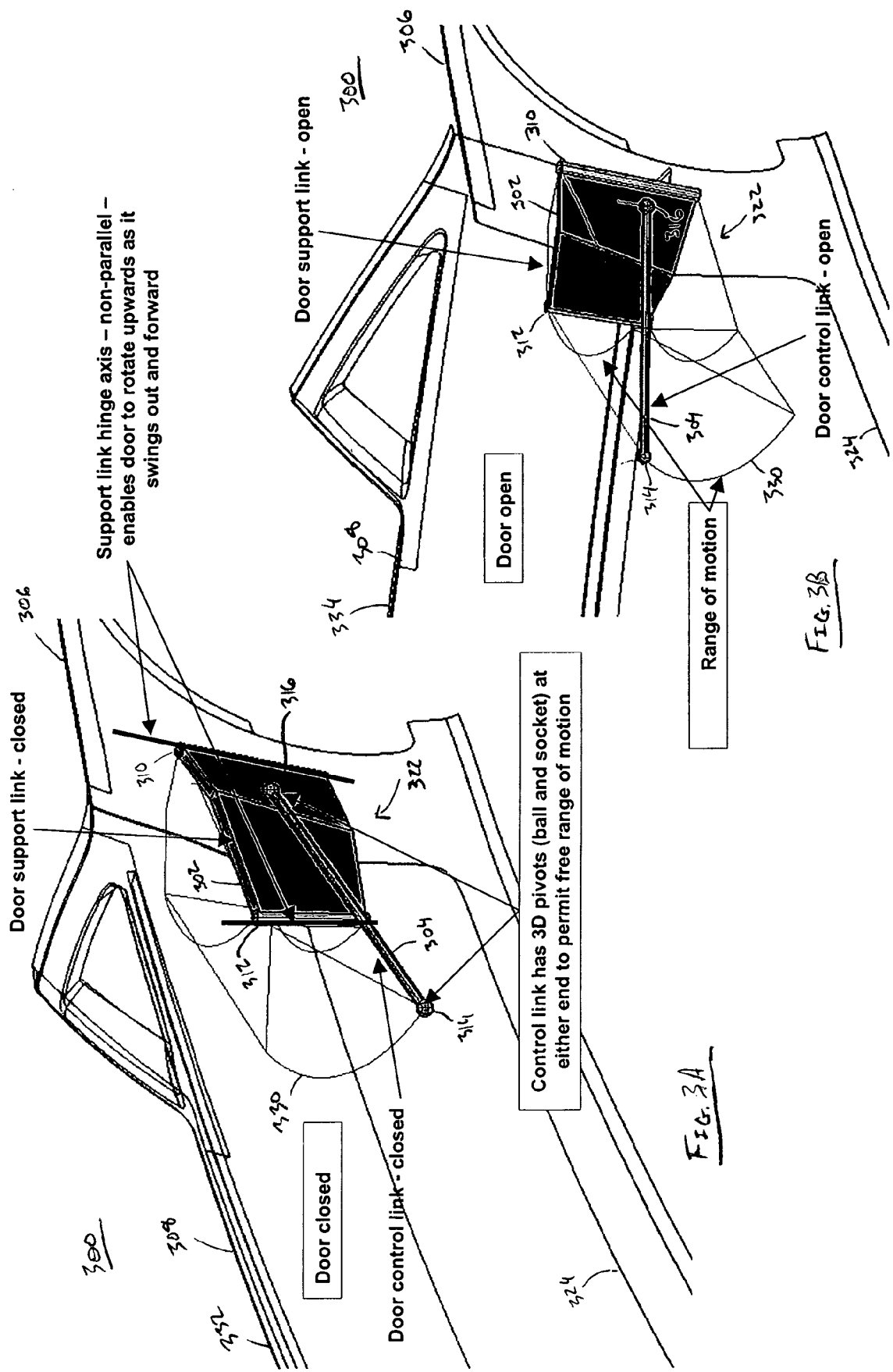

AUTOMOTIVE DOOR HINGE

TECHNICAL FIELD

The present invention relates generally to door hinges and in particular the present invention relates to automotive door hinges and occupant ingress and egress in vehicles.

BACKGROUND

It can be difficult to enter or egress some vehicles, e.g., some sports automobiles, through a door opening because of the occupant's seating position, the shape of the door, or the door opening and/or a lower portion of the frame of the door opening may interfere with the user's legs. In addition, the length of the door and its position relative to the body of the motor vehicle when open may also impede the ease of occupant ingress and egress. Moreover, the door shape, motion, and hinging may also restrict the body styling and shape in order to prevent interference with body work/panels when the door is opened or actuated.

For the reasons stated above, and for other reasons stated below which will become apparent to those skilled in the art upon reading and understanding the present specification, there is a need in the art for alternative doors for motor vehicles.

SUMMARY

The above-mentioned problems with doors of motor vehicles and other problems are addressed by the present invention and will be understood by reading and studying the following specification.

The various embodiments relate to vehicle doors and hinging that allow for the door to be translated forward and rotated upward upon being opened in order to improve occupant ingress and egress and allow for the use of larger door panels. In one embodiment of the present invention, a vehicle hinge mechanism having a four bar link design allows the door to pivot in both the horizontal and vertical planes. In another embodiment of the present invention, a door has a four bar link hinge where the first and second pivots of a first bar of the four bar link hinge each allow for a single degree of motion, the first bar having been twisted such that the pivot points are not co-axial and allow the door to translate vertically and horizontally. A second bar of the four bar link hinge has a first and second pivot points that each allow for three degrees of rotation to allow for the vertical and horizontal translation of the door member when actuated without binding. In yet another embodiment of the present invention, a first bar of a four bar hinge has single dimension of rotation hinges at its coupling with the body and door, whereas a second bar of the four bar hinge has been modified to include ball and socket hinges at its coupling with the body and door to allow the door on opening to angle slightly upwardly at the same time as it is moved horizontally.

Further embodiments of the invention include methods and apparatus of varying scope.

BRIEF DESCRIPTION OF THE DRAWINGS

FIGS. 1A-1C detail simplified diagrams of a motor vehicle in accordance with an embodiment of the present invention.

FIGS. 3A-3C detail simplified diagrams of a door and hinge in accordance with another embodiment of the present invention.

DETAILED DESCRIPTION

Figure 1A:
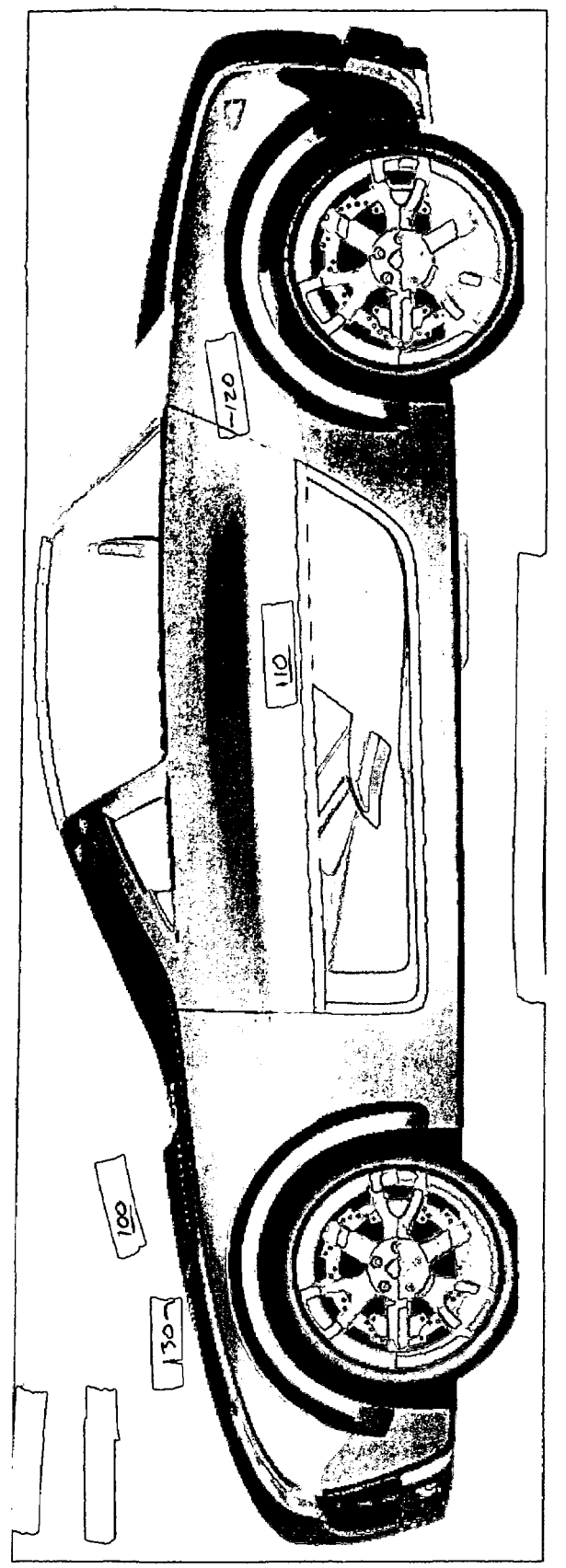

In the following detailed description of the invention, reference is made to the accompanying drawings that form a part hereof, and in which is shown, by way of illustration, specific embodiments in which the invention may be practiced. In the drawings, like numerals describe substantially similar components throughout the several views. These embodiments are described in sufficient detail to enable those skilled in the art to practice the invention. Other embodiments may be utilized and structural, logical, and electrical changes may be made without departing from the scope of the present invention. The following detailed description is, therefore, not to be taken in a limiting sense, and the scope of the present invention is defined only by the appended claims and equivalents thereof.

Embodiments of the present invention include vehicle doors and hinging that allow for the door to be translated forward and rotated upward upon being opened for improved occupant ingress and egress and the use of larger door panels. In one embodiment of the present invention, a vehicle hinge mechanism having a four bar design allows the door to pivot in both the horizontal and vertical planes. The motion (upward angle) of the door in the embodiment of the present invention prevents the door from contacting vehicle body, which is a problem with conventional four bar hinges. In addition, the doors and hinges of embodiments of the present invention allow for the door to be translated slightly outward at the joint of the door with the body to allow for increased body panel clearance and prevention of body panel contact as the door is actuated by the user/occupant. In another embodiment of the present invention, a door has a four bar link hinge where the first and second pivots of a first bar of the four bar link hinge each allow for a single degree of motion, the first bar having been twisted such that the pivot points are not co-axial and allow the door to translate both vertically and horizontally. A second bar of the four bar link hinge has a first and second pivot points that each allow for three degrees of rotation to allow for the vertical and horizontal translation of the door member when actuated without binding.

FIG. 1A is a side view of a vehicle 100 according to one embodiment of the present invention, with its door 110 in a closed position in a door opening or frame 120 of the body. It is noted that for purposes of this disclosure, vehicle or motor vehicle includes any passenger carrying vehicle, including but not limited to, a sports automobile, car, truck, or sport utility vehicle (SUV). FIG. 1B is a partial top view and FIG. 1C is a side view of the motor vehicle 100 having its door 110 in an open position, actuated outward from the door opening 120, showing the vertical, horizontal, and forward translation of the door 110 relative to the body 130 of the motor vehicle. Terms used herein to denote locations and directions, such as up, down, rear, front, forward, above, below, upper, lower, etc., are taken relative to the body 130 of the vehicle 100 as the stationary element, and the door 110 as the movable element.

Motor vehicle doors traditionally utilize hinges that allow for the door to open with a one dimensional range of movement, or one degree of freedom relative to the body of the motor vehicle. The movement of such opening is typically only in the horizontal plane (with pivot points/hinges at the front or rear of the door frame), or rarely, only in the vertical plane (with pivot points/hinges at the top or "shoulder" of the door frame) as the door is actuated to allow for occupant ingress/egress. As a result of this restricted range of movement, the hinges supporting the door and allowing the actuation have therefore typically only been required to have a single dimension (1-D) of movement themselves.

Parallel link or four bar hinges are a form of hinge that utilize a parallelogram shape as its structural basis and have pivot/hinge points at each corner of the parallelogram. A four bar link hinge allows for a more complex range of movement for the door upon actuation. The horizontal range of motion and initial and final orientation of the door can be selected by careful design of the bar lengths and shape of the parallelogram. In embodiments of the present invention, a modified four bar link hinge allows for horizontal, vertical, and forward translation of the door from the door frame and motor vehicle body.

Figure 2C:
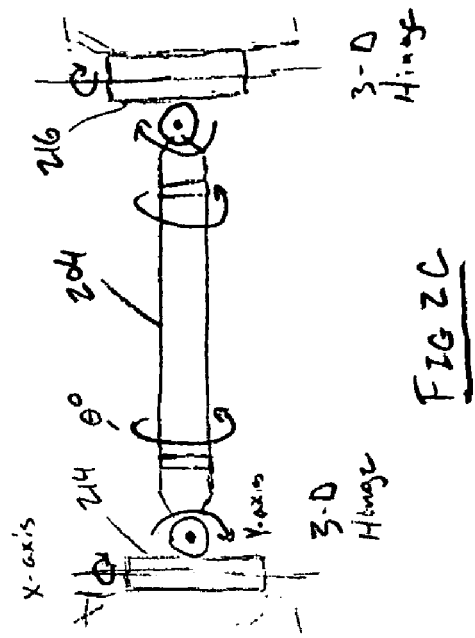
FIGS. 2A-2C detail simplified diagrams of a four bar link door hinge in accordance with an embodiment of the present invention.
Figure 2B:
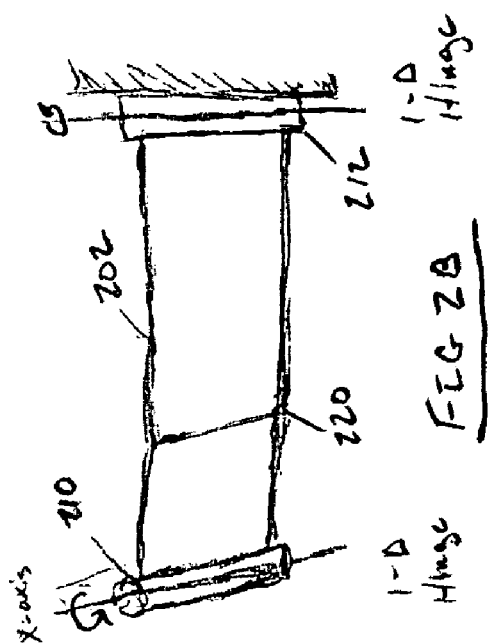
Figure 2A:
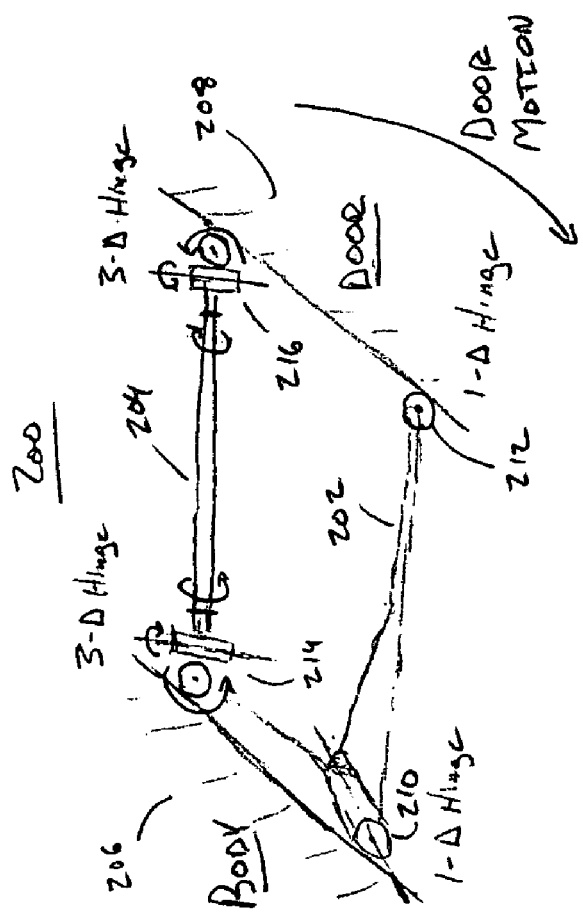

FIGS. 2A-2C detail simplified diagrams of a four bar link door hinge in accordance with an embodiment of the present invention. In FIG. 2A, four bar hinge 200 is detailed, having a first link bar 202 and a second link bar 204, the two remaining sides of the parallelogram of the four bar hinge 200 formed by the connection points of the four bar hinge 200 with the body 206 and the door 208. The first pivot 210 and second pivot 212 of the first bar 202 of the four bar hinge 200 each allow for a single degree of motion (1-D hinges), allowing the first bar 202 of the hinge 200 to rotate horizontally at these pivot points 210, 212. However, the pivot points 210, 212 of the first bar 202 are not co-axial on the first bar 202 (the first bar 202 is in effect "twisted") and thus allow the first bar 202 to translate both vertically and horizontally when actuated around the pivot points 210, 212. The second bar 204 of the four bar hinge 200 also has a first pivot point 214 and second pivot point 216. However, the first pivot point 214 and second pivot point 216 of the second bar 204 each allow for three degrees of movement (3-D hinges) in the vertical (y-axis), horizontal (y-axis) and rotational (θ°) directions along the center or longitudinal axis of the second bar 204 to allow it to follow the movement of the first bar 202 without binding as the first bar 202 actuates within the vertical and horizontal planes. In FIG. 2B a diagram of the first bar 202 and its 1-D pivot points 210, 212 is detailed. The twist or bend 220 of the first bar 202 that places the 1-D pivot points 210, 212 off axis from each other is noted. In FIG. 2C a diagram of the second bar 204 and its 3-D pivot points 214, 216, allowing for movement on the X-axis, Y-axis, and rotational axis (θ°) is detailed.

This four bar link hinge 200 structure, having a first bar link 202 with 1-D pivot points 210, 212 that are not co-axial, and a second bar link 204 having 3-D pivot points 214, 216, allows for the vertical and horizontal translation of the four bar link hinge 200 when it is actuated without having the elements of the four bar link hinge 200 bind. This, in turn, allows the four bar link hinge 200 to horizontally and vertically, outward and forward translate the door 208 from the door frame and motor vehicle body 206 when actuated. In addition, the door 208 is also translated outward and forward to further improve ingress and egress and allow for increased clearance of the door 208 from the door frame and motor vehicle body 206 when in the open position.

Figure 3C:
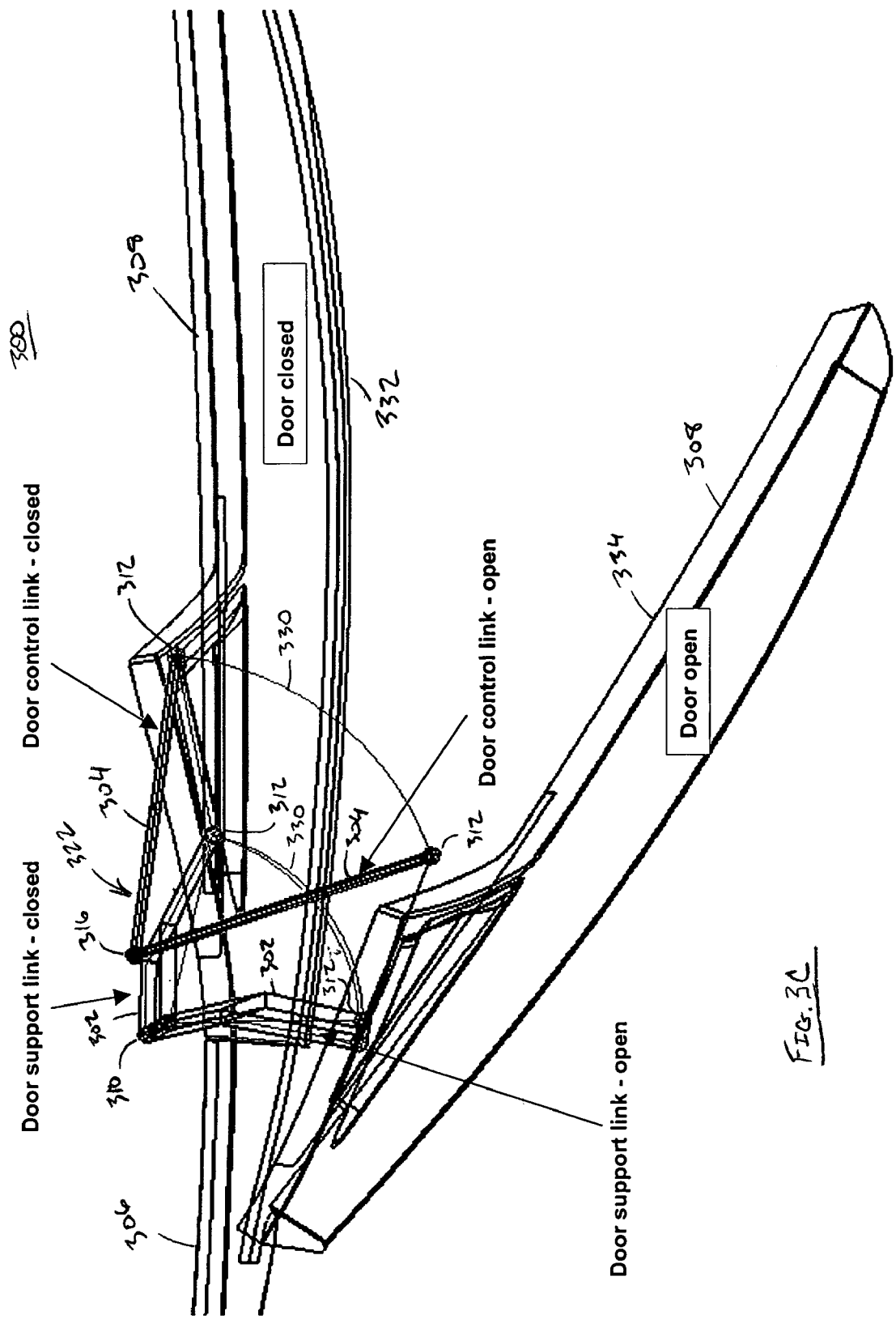

FIGS. 3A-3C detail simplified diagrams of a motor vehicle 300 having a door 308 in a door frame 324 of the body 306 and a four bar link hinge 322 in accordance with another embodiment of the present invention. FIG. 3A details an exploded view of the door 308 and four bar link hinge 322 in the closed position 332, latched into the door frame 324 as viewed from inside the motor vehicle 300. FIG. 3B details an exploded view of the door 308 and four bar link hinge 322 in the actuated or open position 334 and swung out and away from the door frame 324 to allow occupant ingress/egress as viewed from inside the motor vehicle 300. FIG. 3C details a plan view from above of the door 308 and four bar link hinge 322, showing them in both the closed 332 and open 334 positions and the range of motion 330 of the hinge 322.

In FIGS. 3A-3C, the four bar hinge 322 has a first link bar 302 (the door support link) and a second link bar 304 (the door control link), the two remaining sides of the parallelogram of the four bar hinge 300 formed by the connection points of the four bar hinge 322 with the front of door frame 324 and the front of the door 308. The first pivot 310 and second pivot 312 of the first bar 302 (the door support link) of the four bar hinge 300 each allow for a single degree of motion (1-D hinges), allowing the first bar 302 of the hinge 300 to rotate at these pivot points 310, 312. However, the pivot points 310, 312 of the first bar 302 are not co-axial on the first bar 302 and thus allow the first bar 302 to translate both vertically and horizontally when actuated around the pivot points 310, 312, lifting the door 308 horizontally outward and vertically upward as it opens. In addition, the first bar 302 provides an offset to the opening movement of the door, translating the door 308 forward and outward from the body 306.

The second bar 304 (the door control link) of the four bar hinge 322 also has a first pivot point 314 and second pivot point 316 that are ball and socket joints which allow for 3-D of movement in the vertical (y-axis), horizontal (y-axis) and rotational (θ°) axis of the second bar 304. This allows the second bar/door control link 304 to follow the movement of the first bar/door support link 302 without binding, as the first bar 302 actuates within the vertical and horizontal planes during the opening of the door 308.

CONCLUSION

A motor vehicle door and hinging has been described that allows for the door to be translated forward and rotated upward upon being opened in order to improve occupant ingress and egress and allow for the use of larger door panels. In addition, the doors and hinges of embodiments of the present invention allow for the door to be translated slightly outward at the joint of the door with the body to allow for increased body panel clearance as the door is actuated by the user/occupant. In one embodiment of the present invention, a hinge mechanism of a four bar design allows the door to pivot in both horizontal and vertical planes. The unique motion (upward angle) of the door in one embodiment of the present invention prevents the door from contacting vehicle body, which is a problem with conventional four bar hinges. In another embodiment of the present invention, a door has a four bar link hinge where the first and second pivots of a first bar of the four bar link hinge each allow for a single degree of motion, the first bar having been twisted such that the pivot points are not co-axial and allow the door to translate vertically and horizontally. A second bar of the four bar link hinge having a first and second pivot points that each allow for two degrees of rotation to allow for the vertical and horizontal translation of the door member when actuated without binding. In yet another embodiment of the present invention, a first bar of a four bar hinge has single dimension of rotation hinges at its coupling with the body and door, whereas the second bar of the four bar hinge has been modified to include ball and socket hinges its coupling with the body and door to allow the door to angle slightly upwardly at the same time as it is moved horizontally.

Although specific embodiments have been illustrated and described herein, it will be appreciated by those of ordinary skill in the art that any arrangement that is calculated to achieve the same purpose may be substituted for the specific embodiments shown. Many adaptations of the invention will be apparent to those of ordinary skill in the art. Accordingly, this application is intended to cover any adaptations or variations of the invention. It is manifestly intended that this invention be limited only by the following claims and equivalents thereof.

What is claimed is:

1. A four bar hinge, comprising:
   a first bar having a first end and a second end, the first end having a first pivot having a one degree of freedom range of movement and coupled to a stationary element, and the second end having a second pivot having a one degree of freedom range of movement and coupled to a movable element; and
   a second bar also having a first end and a second end, the first end having a first pivot having a three degrees of freedom range of movement and coupled to the stationary element, and the second end having a second pivot having a three degrees of freedom range of movement and coupled to the movable element.

2. The four bar hinge of claim 1, wherein the first and second pivots of the first bar have an x-axis of rotation.

3. The four bar hinge of claim 1, wherein the first and second pivots of the second bar have an x-axis of rotation, a y-axis of rotation, and an axial rotation movement.

4. The four bar hinge of claim 1, wherein an axis of rotation of the first pivot and the second pivot of the first bar are not aligned.

5. The four bar hinge of claim 1, wherein the first and second pivots of the second bar are ball and socket hinges.

6. The four bar hinge of claim 1, wherein the four bar hinge is adapted to translate the movable element in the x-axis and the y-axis relative to the stationary element when the hinge is actuated.

7. The four bar hinge of claim 1, wherein the four bar hinge is adapted to translate the movable element horizontally and vertically relative to the stationary element when the hinge is actuated.

8. The four bar hinge of claim 1, wherein the four bar hinge is adapted to translate the movable element outward and forward relative to the stationary element when the hinge is actuated.

9. A vehicle door, comprising:
   a door frame;
   a door adapted to fit an opening of the door frame; and
   a parallel link hinge coupled between the door and the door frame, the parallel link hinge comprising:
      a support link having a first pivot having a one degree of freedom range of rotational movement, the first pivot coupled to the door frame and to a first end of the support link, and a second pivot having a one degree of freedom range of rotational movement, the second pivot coupled to the door and to a second end of the support link, and where the first and second pivots are not co-axial; and
      a control link having a first pivot having a three degrees of freedom range of rotational movement, the first pivot coupled to the door frame and to a first end of the control link, and a second pivot having a three degrees of freedom range of rotational movement, the second pivot coupled to the door and to a second end of the control link.

10. The vehicle door of claim 9, wherein the first and second pivots of the support link have an x-axis of rotation, and the first and second pivots of the control link have an x-axis of rotation, a y-axis of rotation, and an axial movement of rotation.

11. The vehicle door of claim 9, wherein the first and second pivots of the second bar are ball and socket hinges.

12. The vehicle door of claim 9, wherein the parallel link hinge is adapted to translate the door horizontally and vertically relative to the door frame when the hinge is actuated.

13. The vehicle door of claim 9, wherein the parallel link hinge is adapted to translate the door outward and forward relative to the door frame when the hinge is actuated.

14. A vehicle, comprising:
   a body having a door frame;
   a door fitting an opening of the door frame; and
   a hinge coupled to the door and the door frame, the hinge comprising,
      a first means for linking the door to the body, having a first means for a one dimension of rotation and a second means for a one dimension of rotation, wherein the first means for a one dimension of rotation is coupled to the body, and the second means for a one dimension of rotation is coupled to the door, and
      a second means for linking the door to the body, having a first means for three dimensions of rotation and a second means for three dimensions of rotation, wherein the first means for three dimensions of rotation is coupled to the body, and the second means for three dimensions of rotation is coupled to the door.

15. The vehicle of claim 14, wherein the first and second means for a one dimension of rotation of the first means for linking the door to the body have an x-axis of rotation, and the first and second means for three dimensions of rotation of the second means for linking the door to the body have an x-axis of rotation, a y-axis of rotation, and an axial movement of rotation.

16. The vehicle of claim 14, wherein an axis of rotation of the first and second means for a one dimension of rotation of the first means for linking the door to the body are not aligned.

17. The vehicle of claim 14, wherein the hinge is adapted to translate the door horizontally and vertically relative to the body of the vehicle when the door is opened.

18. The vehicle of claim 14, wherein the hinge is adapted to translate the door outward and forward relative to the body of the vehicle when the door is opened.

19. The vehicle of claim 14, wherein the hinge couples the door to the door frame of the body at one of the front and the rear of the door frame.

20. A method of hinging a vehicle door, comprising:
   supporting a door from a door frame with a first bar link of a four bar link hinge, the first bar link having a first end and a second end, wherein the first end has a first pivot having one dimension of rotational movement and is coupled to the door frame, and where the second end has a second pivot having one dimension of rotational movement and is coupled to the door; and controlling movement of the door while it is opened with a second bar link of the four bar hinge such that the door is translated in the vertical and horizontal planes, the second bar having a first end and a second end, wherein the first end has a first pivot having three dimensions of rotational movement and is coupled to the door frame, and where the second end has a second pivot having three dimensions of rotational movement and is coupled to the door.

21. The method of claim 20, wherein the first and second pivots of the first bar link have an x-axis of rotation, and the first and second pivots of the second bar link have an x-axis of rotation, a y-axis of rotation, and an axial movement of rotation.

22. The method of claim 20, wherein an axis of rotation of the first pivot and an axis of rotation of the second pivot of the first bar link are not aligned.

23. The method of claim 20, further comprising translating the door rotationally outward in the horizontal plane from a connection point of the four bar link hinge with the door frame and vertically upward from the door frame when open.

24. The method of claim 20, further comprising translating the door horizontally forward and outward from a connection point of the four bar link hinge with the door frame when open.

* * * * *